(12) United States Patent
Kruger

(10) Patent No.: US 8,469,849 B2
(45) Date of Patent: Jun. 25, 2013

(54) HYBRID VEHICLE SYSTEM AND CONTROLLER

(75) Inventor: Duane D. Kruger, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 230 days.

(21) Appl. No.: 13/071,900

(22) Filed: Mar. 25, 2011

(65) Prior Publication Data

US 2012/0244979 A1 Sep. 27, 2012

(51) Int. Cl.
*F16H 3/72* (2006.01)
*B60W 10/02* (2006.01)

(52) U.S. Cl.
USPC ........................................ 475/5; 475/8; 477/5

(58) Field of Classification Search
USPC ................................ 475/5, 8, 149, 317; 477/5
See application file for complete search history.

(56) References Cited

U.S. PATENT DOCUMENTS

| | | | |
|---|---|---|---|
| 2010/0087290 A1* | 4/2010 | Schoenek et al. | 477/5 |
| 2011/0111906 A1* | 5/2011 | Kim et al. | 475/5 |
| 2011/0118078 A1* | 5/2011 | Kraska et al. | 477/5 |

\* cited by examiner

*Primary Examiner* — Edwin A Young
(74) *Attorney, Agent, or Firm* — Lawrence D. Hazelton

(57) ABSTRACT

A system for operating a hybrid vehicle that includes a chargeable energy storage device, a single dynamo (motor/generator combination) an internal combustion engine, and a torque coupling device configured to variably couple the engine to the dynamo. The torque coupling device is such that using only a single dynamo, the system is able to operate in different modes expected of hybrid vehicles, such as: electric drive only, engine drive only, electric and engine drive combined, and charging of the chargeable energy storage device.

17 Claims, 2 Drawing Sheets

HYBRID VEHICLE SYSTEM AND CONTROLLER

TECHNICAL FIELD OF INVENTION

The invention generally relates to hybrid vehicle systems, and more particularly relates to a hybrid vehicle system having a single dynamo and a torque coupling device that variably couples an internal combustion engine to an electric motor.

BACKGROUND OF INVENTION

Several configurations of Hybrid Electric Vehicles (HEV) systems are known. As used herein, a HEV system generally propels a vehicle in several modes such as using an internal combustion engine only, a dynamo or combination motor/generator only, or by combining torques from both the engine and the dynamo. FIG. 1 illustrates an example of a HEV system 100 that includes an engine, two dynamos or motor/generator combinations—MG1 and MG2, two inverters—INV1 and INV2, and a planetary gear set PG.

The engine and MG1 cooperate via the planetary gear set to provide the main motive power to the vehicle. In one mode, MG1 generates electric power to react against engine torque. This interaction produces a reactionary torque to the sun gear that is transmitted to vehicle wheels. The variable speed relation of MG1 to the engine determines the final speed of the vehicle and so may be viewed as an electric continuously variable transmission (CVT). In another mode MG1 produces torque to start the engine. In another mode MG1 produces electrical energy to operate the vehicle's electrical system or be stored in a battery. When the battery cannot accept the continuous MG1 generator power, MG2 can consume this power to produce additional propulsion torque to the wheels. In another mode known as regenerative braking, MG2 can generate electricity to be stored in the battery for future use. The various modes of operation will now be described in more detail.

Engine start: To start the engine, power is applied to MG1 to act as a starter. Because of the size of the motor generators, starting the engine requires relatively little power from MG1. Furthermore, the engine is not equipped with a conventional starter motor and so typical starter motor sound is not heard. Engine start can occur while the vehicle is stopped or moving.

Forward travel: In general, the engine and motor are operating cooperatively to propel the vehicle. When accelerating at relatively low speeds, the engine may operate at a speed greater than the wheels and drive MG1 operating as a generator. The electric energy output by MG1 is fed to MG2, and torque from MG2 operating as a motor is added to the engine torque applied to the vehicle driveshaft. When cruising at relatively high speed, the engine may operate at slower than the wheels but still drives MG1 operating as a generator to producing electrical power that is fed to MG2. Again, MG2 operates as a motor to combine with the engine torque to propel the vehicle. During steady, relatively normal speed operation the engine generally provides all of the power to propel the car. Then during conditions when torque demand exceeds engine capability, such as during heavy acceleration or driving up a steep incline at high speed, electrical energy from the battery is consumed to make up the difference. Whenever the required propulsion power changes, the battery quickly balances the power budget, allowing the engine to change power relatively slowly.

Reverse travel: In some HEV systems there may not be a conventional gearbox to provide a reverse gear. To back the vehicle the computer may feed negative voltage to MG2 and so provide negative torque to the wheels. However, there have been instances when backing vehicles up steep hills was not possible because of insufficient torque.

Silent operation: At slow speeds and moderate torques the HEV may operate without running the internal combustion engine at all. Electricity may be supplied only to MG2, while allowing MG1 to rotate freely and thus decoupling the engine from the wheels. This mode is popularly known as "Stealth Mode." Provided that there is enough battery power, the car can be driven in this silent mode for some miles without consuming gasoline. The battery may be later recharged by plugging the system into a battery charging system or an electrical outlet in a parking garage.

Neutral gear: Most jurisdictions require automotive transmissions to have a neutral gear that decouples the engine and transmission. The neutral gear can be provided by turning the electric motors off. In this mode the planetary gear is stationary if the vehicle wheels are not turning. If the vehicle wheels are turning, the ring gear will rotate causing the sun gear to rotate as well. The engine inertia will generally keep the carrier gear stationary unless the speed is large. In this mode the MG1 freewheels so no power is dissipated.

Regenerative braking: By drawing power from MG2 and depositing it into the battery pack, the HEV can decelerate the vehicle while saving electrical power for future use. Typically, the regenerative brakes in an HEV system absorb a significant amount of the normal braking load, so the conventional brakes on HEV vehicles may be undersized compared to brakes on a conventional car of similar mass.

Compression braking: The HEV system may have a special transmission setting labeled 'B' for Brake that may be manually selected in place of regenerative braking to provide engine braking on hills. Also, if the battery is approaching potentially damaging high charge levels, the HEV system may switch to conventional compression braking, drawing power from MG2 and shunting it to MG1, thereby speeding the engine with throttle closed to absorb energy and decelerate the vehicle.

Battery charging: The HEV system may charge its battery without moving the car by running the engine and extracting electrical power from MG1. The power gets shunted into the battery, and no torque is supplied to the wheels.

The system described above relies on two dynamos (i.e. motor/generator combination) and two inverters to operate or propel a vehicle. These dynamos and invertors are relatively expensive. What is needed is a HEV system that does not require all of these parts to provide the modes of operation described above and so is less expensive to manufacture.

SUMMARY OF THE INVENTION

In accordance with one embodiment of this invention, a system for operating a hybrid vehicle is provided. The system includes a chargeable energy storage device, a single dynamo, an engine, and a torque coupling device. The chargeable energy storage device is for storing electrical energy. The single dynamo is configured to operate in a motor mode for propelling the vehicle and operate in a generator mode for charging the energy storage device. The engine is configured to operate at an engine speed. The torque coupling device is configured to variably couple the engine to the dynamo. With these parts, the system is configured to (a) operate in a first mode wherein the dynamo is coupled to the energy storage device to operate the dynamo in the motor mode for propelling the vehicle, the engine is not operated, and the engine is not coupled to the dynamo, (b) operate in a second mode wherein the dynamo is coupled to the energy storage device to operate the dynamo in the motor mode for propelling the vehicle, and the dynamo is coupled to the engine such that the engine is motored by the dynamo for starting the engine, (c) operate in a third mode wherein the dynamo is coupled to the energy storage device to operate the dynamo in the motor mode for propelling the vehicle, and the engine is operated at an engine speed less than a speed threshold whereby the engine does not propel the vehicle, and (d) operate in a fourth mode wherein the engine is operated at an engine speed equal to or greater than the speed threshold for propelling the vehicle.

In another embodiment of the present invention, a controller is provided. The controller is configured to be coupled to an engine configured to operate at an engine speed, coupled to a single dynamo configured to operate in a motor mode for generating mechanical energy and operate in a generator mode for generating electrical energy, coupled to a clutching means, and coupled to an energy storage device. The controller is also configured to (a) operate in a first mode wherein the dynamo is coupled to the energy storage device by the controller to operate the dynamo in the motor mode for propelling the vehicle, the engine is not operated, and the engine is not coupled to the dynamo, (b) operate in a second mode wherein the dynamo is coupled to the energy storage device by the controller to operate the dynamo in the motor mode for propelling the vehicle, and the dynamo is coupled to the engine such that the engine is motored by the dynamo for starting the engine, (c) operate in a third mode wherein the dynamo is coupled to the energy storage device by the controller to operate the dynamo in the motor mode for propelling the vehicle, and the engine is operated by the controller at an engine speed less than a speed threshold whereby the engine does not propel the vehicle, and (d) operate in a fourth mode wherein the engine is operated by the controller at an engine speed equal to or greater than the speed threshold for propelling the vehicle . . . .

In yet another embodiment of the present invention, a torque coupling device is provided. The torque coupling device is for a hybrid vehicle propulsion system and is configured to variably couple an engine to a single dynamo. The torque coupling device includes a first directional clutch, a clutching means, and a second directional clutch. The first directional clutch is configured to couple the engine to the dynamo such that during a first mode the engine is not motored by the dynamo. The clutching means is operable to an engaged state whereby torque is transferred through the clutching means, and operable to a disengaged state whereby no torque is transferred through the clutching means. The second directional clutch coupled the engine to the clutching means such that when the dynamo is rotating and the engine is not operating and the clutching means is disengaged, a second mode of operation is initiated by engaging the clutching means so the engine is motored by the dynamo for starting the engine.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 2:
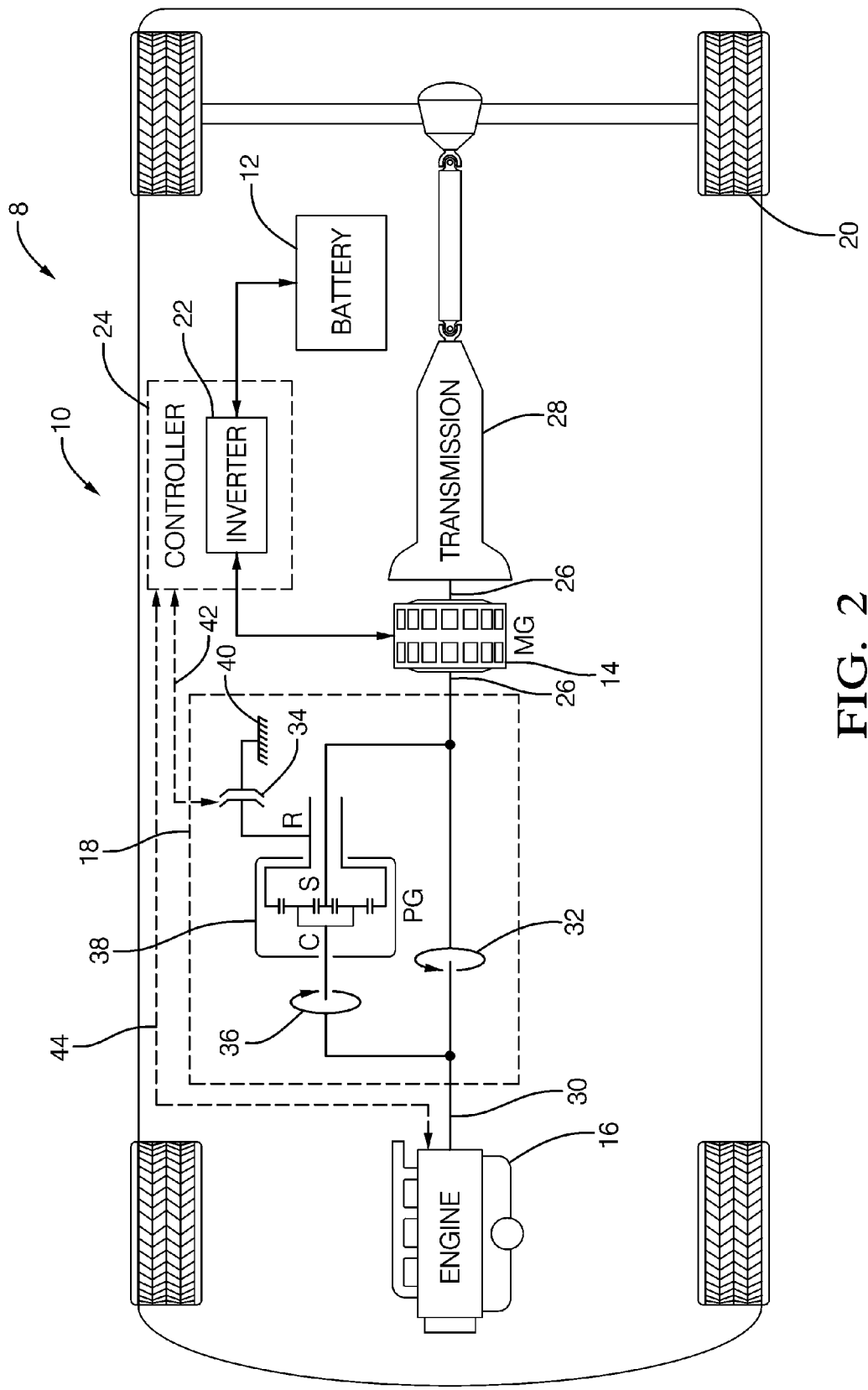
FIG. 2 is a hybrid vehicle system in accordance with one embodiment.

In accordance with an embodiment of a hybrid vehicle 8, FIG. 2 illustrates a system 10 that includes a chargeable energy storage device 12, a single dynamo 14, an engine 16, and a torque coupling device 18. The system 10 propels the hybrid vehicle 8 by providing torque to a vehicle wheel 20. As described in more detail below, the system 10 may propel the hybrid vehicle 8 using torque from the engine 16 only, torque from the dynamo 14 only, or by combining torques from both the engine 16 and the dynamo 14.

The chargeable energy storage device 12 is, in general, for storing electrical energy. Non-limiting examples of a suitable chargeable energy storage device 12 include a battery and an ultra-capacitor. Alternatively, the chargeable energy storage device 12 may store mechanical energy such as a rotating mechanical mass storing mechanical energy by the property of inertia, or a pressure tank storing mechanical energy by compressing material such as gas or hydraulic fluid in a pressure storage tank. Hereafter, the chargeable energy storage device 12 may often be referred to as a battery 12, but this is only for the convenience of description and not a limitation on the broader term chargeable energy storage device 12.

Figure 1:
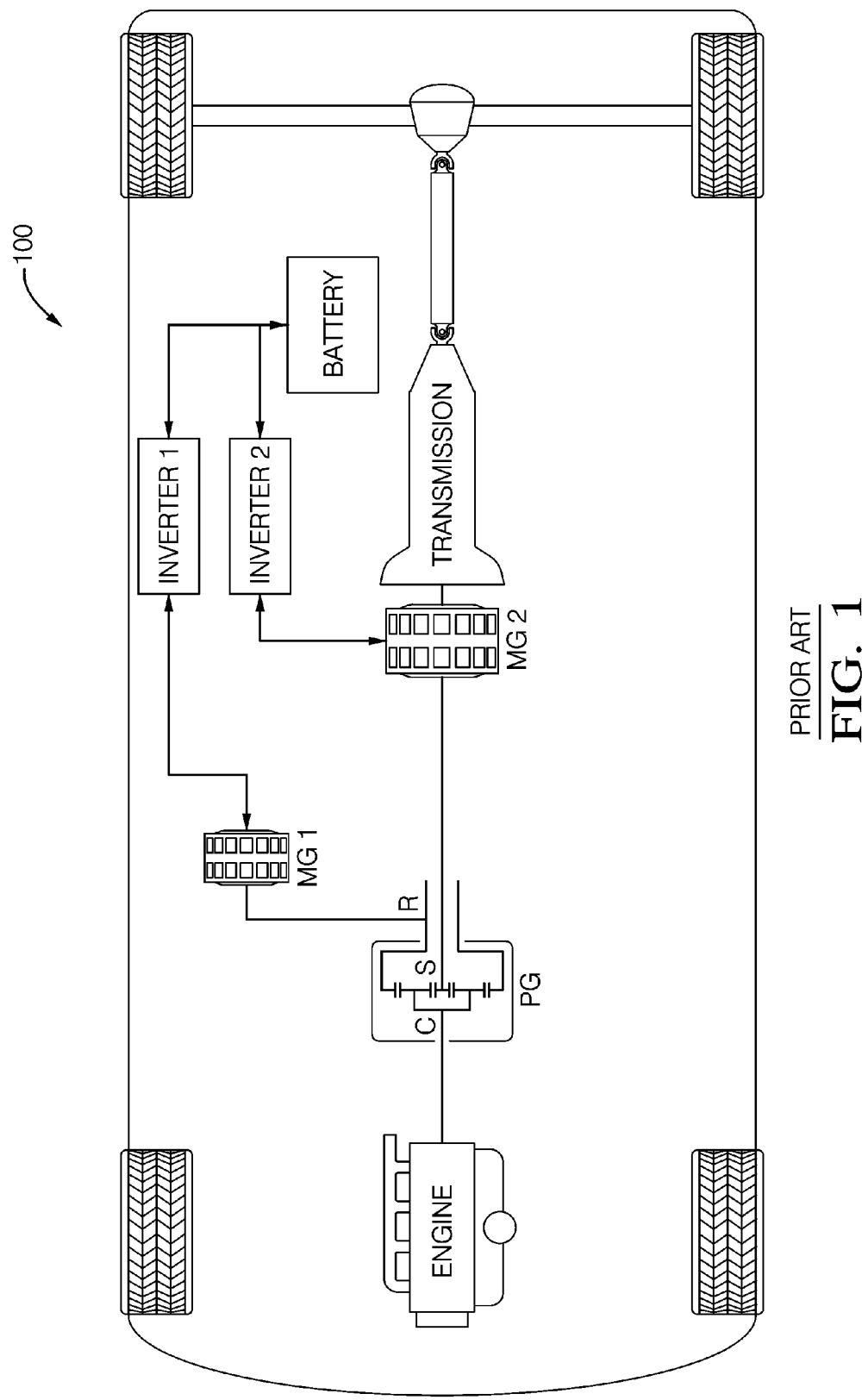
FIG. 1 is a schematic diagram of a known hybrid vehicle system.

The single dynamo 14 is generally configured to operate in a motor mode for propelling the vehicle 8, and operate in a generator mode for charging the chargeable energy storage device 12. As used herein, a dynamo is any electro-mechanical device that can generate electrical energy in response to mechanical energy being provided to the dynamo 14, and generate mechanical energy in response to electrical energy being provided to the dynamo 14. Various types of electric motors can operate in both modes, that is, as a generator and/or as a motor, and so may be suitable dynamos. As used herein, the term single dynamo means a system having only one dynamo. As such, any system using more than one dynamo is specifically excluded. For example, FIG. 1 does not show a hybrid vehicle system having a single dynamo, but it does show a system 100 having more than one dynamo, MG1 and MG2. The system 10 in FIG. 2 is further distinguished from the system 100 of FIG. 1 in that system 10 only needs one inverter. As such, Applicant's system 10 in FIG. 2 is simpler to operate, and so requires a less complicated controller, and is less expensive since only one dynamo and one inverter is needed.

If the chargeable energy storage device 12 stores electrical energy, the chargeable energy storage device 12 may be a battery, hereafter often battery 12. As such, then the dynamo 14 may be an electric motor such as a permanent magnet direct current motor, or a permanent magnet brushless motor, or an electromagnetic type motor. It is known that these examples and other types of electric motors may be operated in both a motor mode for outputting mechanical energy, and in a generator mode for outputting electrical energy. The electrical energy produced by the dynamo 14 when operated in the motor mode may be stored in the battery 12 for later use, and/or may used to power other electrical devices on the hybrid vehicle 8 such as windshield wipers, power windows, or vehicle lights.

As illustrated, the system 10 may also include an inverter 22, possibly part of a controller 24, for managing the flow of electrical energy into and out of the dynamo 14 and the battery 12. As used herein, the inverter 22 is a device that converts electrically energy from the battery 12 into a form suitable for operating the dynamo 14 in the motor mode, and also converts electrical energy generated by the dynamo 14 into a form suitable for charging the battery 12.

The controller 24 may include a processor such as a microprocessor or other control circuitry as should be evident to those in the art. The controller 24 may include memory, including non-volatile memory, such as electrically erasable programmable read-only memory (EEPROM) for storing one or more routines, thresholds and captured data. The one or more routines may be executed by the processor to perform steps for determining if signals received by the controller 24 for operating the system 10 as described herein. The controller may also include signal inputs and output for communicating with other vehicle devices, such as the engine 16 via an engine control signal 44. The engine control signal 44 may include, but is not limited to, a signal to control the speed of the engine 16.

The dynamo 14 may have a motor shaft 26 extending through the dynamo 14, and so the rotational speed of the shaft on both sides of the dynamo 14 is the same. The motor shaft 26 may be coupled to the vehicle wheel 20 by a transmission 28, for example a known automatic transmission, and also may be coupled to the torque coupling device 18.

The engine 16 is generally configured to operate at an engine speed. The engine 16 may be a typical four-cycle piston driven internal combustion engine operating on well known principles of cyclical compression and ignition of fuel such as gasoline or diesel fuel. As such, the engine speed may be proportional to a crankshaft speed of the engine 16. Alternatively the engine may be a turbine type engine that typically has a turbine shaft speed substantially higher that a typical crankshaft speed. The engine 16 may also include a speed reduction gear box (not shown) so the speed of an engine shaft 30 that is coupled into the torque coupling device 18 is suitable for coupling with the motor shaft 26.

The torque coupling device 18 is generally configured to operate in several distinct modes in order to variably couple the engine 16 to the dynamo 14. As the motor shaft 26 is rotated, torque may be provided to the vehicle wheel 20 to propel the hybrid vehicle 8. The various modes of operation of the system 10, or more particularly the torque coupling device 18, are now described.

The system 10 or the torque coupling device 18 may be configured to (a) operate in a first mode wherein the dynamo 14 is coupled to the energy storage device 12 in a manner effective to operate the dynamo 14 in the motor mode for propelling the vehicle 8. In this first mode, the engine 16 is not operated and so the vehicle 8 is only propelled by the dynamo 14. The torque coupling device 18 is configured so that if the dynamo 14 is rotating in a forward direction and the engine shaft 30 is not rotating, then engine 16 is not coupled to the dynamo 14, and so the engine 16 does not put any mechanical load or drag on the dynamo 14. As used herein, the term forward direction is only used for the purpose of explanation and not limitation. With this feature, the first mode of operation energy efficiency is maximized when propelling the vehicle 8 only using the dynamo 14.

The system 10 or the torque coupling device 18 may also be configured to (b) operate in a second mode wherein the dynamo 14 is coupled to the energy storage device 12 to operate the dynamo 14 in the motor mode for propelling the vehicle 8. Like the first mode described above, while in the second mode the vehicle 8 is only propelled by the dynamo 14 in this second mode. However, in this second mode the dynamo 14 is coupled to the engine 16 such that the engine 16 is motored or cranked by the dynamo 14 for the purpose of starting the engine 16. As such, the engine 16 does not need to be equipped with a conventional starter motor, thereby avoiding the expense and noise of providing and operating a conventional starter motor.

The system 10 or the torque coupling device 18 may also be configured to (c) operate in a third mode wherein the dynamo 14 is coupled to the energy storage device 12 in a manner effective to operate the dynamo 14 in the motor mode for propelling the vehicle 8. Like the first mode described above, while in the third mode the vehicle 8 is only propelled by the dynamo 14. In the third mode the engine 16 is operated at an engine speed (i.e.—speed of the motor shaft 26) less than a speed threshold. The speed threshold is a value generally proportional to the instant motor speed. FIG. 2 suggests that the speed threshold is equal to the instant motor speed (i.e.—speed of the motor shaft 26) since no ratio-changing gearbox is suggested. However, a ratio-changing gear box may be provided to allow for engine speeds other one-to-one ratios with respect to motor shaft 26 speeds for the engine 16 to contribute torque for propelling the vehicle 8 and/or rotating the motor shaft 26 while the dynamo is operated in the generator mode. Like the first mode above, during the third mode the engine 16 does not propel the vehicle 8. This third mode of operation typically occurs after the engine 16 has been started following the second mode, but before the engine 16 has accelerated to an engine shaft 30 speed useful for propelling the vehicle 8. Also, this third mode may be used to allow the engine 16 warm-up after being initially started, or to run diagnostics on the engine 16 by providing for unloaded operation of the engine 16.

The system 10 or the torque coupling device 18 may also be configured to (d) operate in a fourth mode wherein the engine is operated at an engine speed equal to or greater than the speed threshold for propelling the vehicle 8. In one embodiment of the torque coupling device 18, as will be explained in more detail below, is configured so the engine speed of the engine shaft 30 cannot exceed the motor speed of the motor shaft. As such, the speed threshold is proportional to the rotor speed (i.e.—speed of the motor shaft 26). In an alternative embodiment the torque coupling device may include a viscous coupling or friction coupling that allows the engine speed to be greater than the motor speed.

The system 10 or the torque coupling device 18 may also be configured to (e) operate in a fifth mode wherein the engine 16 is operated at an engine speed equal to or greater than the speed threshold for propelling the vehicle 8, and the dynamo 14 is coupled to the energy storage device 12 to operate the dynamo 14 in the motor mode for propelling the vehicle 8. In this fifth mode both the dynamo 14 and the engine 16 provide torque that is combined to propel the vehicle 8. This fifth mode may be useful, for example, when rapid acceleration is desired or when a steep hill is being climbed.

The system 10 or the torque coupling device 18 may also be configured to (f) operate in a sixth mode wherein the engine 16 is operated at an engine speed equal to or greater than the speed threshold for propelling the vehicle 8, the engine 16 is coupled to the dynamo 14 and the dynamo 14 is operated in the generator mode for charging the energy storage device 12. In this sixth mode only torque from the engine 16 propels the vehicle 8. In this sixth mode the engine 16 also provides torque for operating the dynamo 14 in the generator mode. The electrical energy produced by the dynamo 14 may also be used to operate other electrical systems on the vehicle 8, in addition to or in stead of charging the battery 12.

The system 10 or the torque coupling device 18 may also be configured to (g) operate in a seventh mode wherein when vehicle deceleration is desired, the engine 16 is operated at an engine speed less than the speed threshold, and the dynamo 14 is operated in the generator mode for regenerative braking the vehicle 8. In this seventh mode the engine may be stopped or operating at a low speed (e.g. idle) such that the engine 16 is not providing negative or reverse torque for the purpose of slowing the vehicle 8. The electrical energy produced during regenerative braking may be, for example, used to charge the battery 12, operate other electrical systems on the vehicle 8, or converted to heat by dissipating the electrical energy through a resistor (not shown).

The system 10 or the torque coupling device 18 may also be configured to (h) operate in a eighth mode wherein when vehicle deceleration is desired, the engine is operated at an engine speed less than the speed threshold, and the dynamo 14 is coupled to the engine such that the engine is motored by the dynamo 14 for compression braking the vehicle 8. The deceleration provided by this eighth mode in general only comes from engine braking. This eighth mode may be useful if the battery 12 is already fully charged and no substantial energy is being consumed by the vehicle electrical system. Also, compression braking of the vehicle 8 may be combined with the regenerative braking described above. The advantage of decelerating the vehicle 8 by using regenerative braking and/or compression braking is that the vehicle's friction braking system may not need to be as robust when compared to friction braking systems on vehicles that do not provide regenerative braking and/or compression braking.

The modes of operation described above could be provided without the transmission 28 illustrated. However the transmission 28 may be advantageous for optimizing the speed/load relationship between the vehicle wheel 20 and the operation of the dynamo 14 and engine 16. Furthermore, laws may require or it may be desirable to be able to selectively decouple the dynamo 14 from the vehicle wheel 20 by, for example, shifting the transmission 28 in to 'park' or 'neutral'.

If an embodiment of the system 10 includes a transmission 28 configured to variably couple the dynamo 14 to the vehicle 8 for controlling propulsion of the vehicle 8, then the system 10 or the torque coupling device 18 also may be configured to (i) operate in an ninth mode wherein the transmission is operated to decouple the dynamo 14 from the vehicle 8, and the engine 16 is coupled to the dynamo 14 to operate the dynamo 14 in the generator mode for charging the energy storage device 12, for example, while the vehicle 8 is parked. Such a mode of operation may be useful to fully recharge the battery 12 after climbing a hill and then suddenly parking the vehicle 8 before the system 10 has been able to fully recharge the battery 12 while traveling. This mode may also be useful when parking the vehicle 8 for an extended period of time, for example—months. Also, this mode may also be useful if the vehicle 8 is partially disabled, for example by a flat tire, and the warning flashers are left operating while the vehicle 8 is parked along a roadway waiting for a tow vehicle or waiting to be repaired.

FIG. 2 illustrates an embodiment of a torque coupling device 18 that will now be described. The torque coupling device 18 may include a first one-way clutch or a first directional clutch 32. As used herein a directional clutch is a device that allows relative rotation in one direction of one side of the directional clutch with respect to the other side of the directional clutch, but prevents or resists relative rotation in the opposite direction. Purely mechanical versions of such devices are readily available, but such a function may also be provided hydraulically. The first directional clutch 32 is generally configured to couple the engine 16 to the dynamo 14 such that during the first mode the engine 16 is not motored by the dynamo 14. However, during the forth mode the speed of the engine shaft 30 can not exceed the speed of the motor shaft 26, and so the engine 16 at least helps to propel the vehicle 8.

The torque coupling device 18 may also include a clutching means 34. As used herein a clutching means 34 is a device operable to an engaged state whereby torque is transferred through the clutching means 34, and operable to a disengaged state whereby no torque is transferred through the clutching means 34. A variety of such clutching means are known that may be mechanically or hydraulically actuated. The torque coupling device 18 may also include a second directional clutch 36 for coupling the engine 16 to the clutching means 34 such that when the dynamo 14 is rotating, the engine 16 is not operating, and the clutching means 34 is in the disengaged state, then the second mode of operation may be initiated by operating the clutching means 34 to the engaged state so the engine is motored by the dynamo 14. The second directional clutch 36 is oriented so the engine 16 can be cranked at a cranking speed, but if the engine 16 is operated at an engine speed greater than the cranking speed then the second directional clutch 36 free-wheels.

The torque coupling device 18 may also include a planetary gear set 38 interposed between the dynamo 14 and the engine 16. The planetary gear set 38 includes a sun gear S, ring gear R, and a carrier C of planetary gears, wherein the sun gear S is coupled to the dynamo 14, the carrier C is coupled to the second directional clutch 36, the ring gear is coupled the clutching means 34. One side of the clutching means 34 may be fixedly coupled to an anchor point 40 such that the one side of the clutching means does not rotate or otherwise move. As such, when the clutching means 34 is operated to the engaged state, the clutching means 34 is configured to hold the ring gear R still. In general, the planetary gear set 38 provides a gear reduction from the dynamo 14 to the engine 16, and therefore a torque multiplication which requires less motor torque for starting the engine 16. When an engine start is desired, the clutching means 34 is engaged to hold the ring gear R still. Once the ring gear R stops turning, the engine crank speed is proportional to the gear ratio of the planetary gear set 38, for example a ratio of 3:1. Once the engine 16 reaches the desired crank speed, fuel is delivered to the engine 16 and the engine 16 can then escape freely from the planetary carrier speed by overrunning the second directional clutch 36. The clutching means 34 can now be disengaged until the next start event (second mode) or until compression braking (eighth mode) is needed. The running engine cannot supply torque to the driveline until the engine 16 accelerates to an engine speed equal to the motor speed. When the engine 16 reaches the same rotational speed as the dynamo 14, then first directional clutch 32 will lock-up and allow engine torque to be applied to the vehicle wheel 20 via the motor shaft 26.

Continuing to refer to FIG. 2, the controller 24 may be coupled to the energy storage device 12 for monitoring the state of charge of the energy storage device 12. The controller 24 may also be coupled to the engine 16 by way of an engine control signal 44 for the purpose of operating the engine 16, for example controlling the speed the engine 16. The controller 24 may also be coupled to the dynamo 14 for the purpose of controlling the operational mode (motor mode or generator mode) of the dynamo 14. The controller 24 may also be coupled to the clutching means 34 by a clutch control signal 42 for the purpose of operating the clutching means 34 to the engaged state or the disengaged state.

Automatic engine decoupling occurs when positive engine torque is not present. Once the engine throttle is lifted, the engine 16 is automatically decoupled from the dynamo 14, and can slow to an idle or stop altogether. The engine 16 can be started at any time. If the vehicle is not moving, the engine 16 can be started by shifting the transmission 28 to park or neutral, operating the clutching means 34 to the engaged state, and then operating the dynamo 14 in the motor mode. When the vehicle is launched electrically and therefore the motor shaft 26 is rotating, the clutching means 34 may slip until the ring gear R is stopped in order to start the engine 16.

Accordingly, a hybrid vehicle system 10, a controller 24 for the hybrid vehicle system 10 and a torque coupling device 24 is provided. The system has only one planetary gear set 24, directional clutches 32 and 36, only one dynamo 14 and only one inverter 22 to perform all the hybrid functions of other known hybrid vehicle systems that typically require 2 electric motors (dynamos), 2 inverters, and a several of planetary gears. As such, system 10 is less expensive than the known art by eliminating at least one dynamo and one inverter. The controller 24 is also simplified and so offers other potential savings. The system 10 is readily adapted to conventional power-train configurations via the transmission 28 thereby allowing for flexible high volume implementation. The system 10 provides automatic decoupling of the engine 18 from a parallel hybrid electric type drive-train. The system 10 also provides for quiet starting the engine using the single dynamo as a starter motor. The decoupling of the engine 18 and dynamo 14 is particularly useful for Plug-in Electric Vehicles (PEV). The system 10 provides many engine-off hybrid functions including, engine off at vehicle stops, engine off on deceleration, engine off on acceleration (electric launch), engine-off during light load cruise, Electric Vehicle (EV) driving mode, torque assist or engine boost, regenerative braking, and starting of the engine.

While this invention has been described in terms of the preferred embodiments thereof, it is not intended to be so limited, but rather only to the extent set forth in the claims that follow.

I claim:

1. A system for operating a hybrid vehicle, said system comprising:
   a chargeable energy storage device for storing electrical energy;
   a single dynamo configured to operate in a motor mode for propelling the vehicle, and operate in a generator mode for charging the energy storage device;
   an engine configured to operate at an engine speed; and
   a torque coupling device configured to variably couple the engine to the dynamo, wherein said system is configured to
   (a) operate in a first mode wherein the dynamo is coupled to the energy storage device to operate the dynamo in the motor mode for propelling the vehicle, the engine is not operated, and the engine is not coupled to the dynamo,
   (b) operate in a second mode wherein the dynamo is coupled to the energy storage device to operate the dynamo in the motor mode for propelling the vehicle, and the dynamo is coupled to the engine such that the engine is motored by the dynamo for starting the engine,
   (c) operate in a third mode wherein the dynamo is coupled to the energy storage device to operate the dynamo in the motor mode for propelling the vehicle, and the engine is operated at an engine speed less than a speed threshold whereby the engine does not propel the vehicle, and
   (d) operate in a fourth mode wherein the engine is operated at an engine speed equal to or greater than the speed threshold for propelling the vehicle.

2. The system in accordance with claim 1, wherein the dynamo is configured to operate at a rotor speed, and the speed threshold is proportional to the rotor speed.

3. The system in accordance with claim 1, wherein the system is further configured to (e) operate in a fifth mode wherein the engine is operated at an engine speed equal to or greater than the speed threshold for propelling the vehicle, and the dynamo is coupled to the energy storage device to operate the dynamo in the motor mode for propelling the vehicle.

4. The system in accordance with claim 1, wherein the system is further configured to (f) operate in a sixth mode wherein the engine is operated at an engine speed equal to or greater than the speed threshold for propelling the vehicle, the engine is coupled to the dynamo to operate the dynamo in the generator mode for charging the energy storage device.

5. The system in accordance with claim 1, wherein the system is further configured to (g) operate in a seventh mode wherein when vehicle deceleration is desired, the engine is operated at an engine speed less than the speed threshold, and the dynamo is operated in the generator mode for regenerative braking the vehicle.

6. The system in accordance with claim 1, wherein the system is further configured to (h) operate in a eighth mode wherein when vehicle deceleration is desired, the engine is operated at an engine speed less than the speed threshold, and the dynamo is coupled to the engine such that the engine is motored by the dynamo for compression braking the vehicle.

7. The system in accordance with claim 1, wherein the system further comprises a transmission configured to variably couple the dynamo to the vehicle for controlling propulsion of the vehicle, and wherein the system is further configured to (i) operate in an ninth mode wherein the transmission is operated to decouple the dynamo from the vehicle, and the engine is coupled to the dynamo to operate the dynamo in the generator mode for charging the energy storage device.

8. The system in accordance with claim 1, wherein the torque coupling device comprises a first directional clutch configured to couple the engine to the dynamo such that during the first mode the engine is not motored by the dynamo.

9. The system in accordance with claim 1, wherein the torque coupling device comprises a clutching means operable to an engaged state whereby torque is transferred through the clutching means, and operable to a disengaged state whereby no torque is transferred through the clutching means, and
   a second directional clutch coupling the engine to the clutching means such that when the dynamo is rotating, the engine is not operating, and the clutching means is in the disengaged state, then the second mode of operation is initiated by operating the clutching means to the engaged state so the engine is motored by the dynamo.

10. The system in accordance with claim 9, wherein the torque coupling device further comprises a planetary gear set interposed between the dynamo and the engine, said planetary gear set comprising a sun gear, ring gear, and a carrier of planetary gears, wherein the sun gear is coupled to the dynamo, the carrier is coupled to the second directional clutch, and the ring gear is coupled to the clutching means.

11. The system in accordance with claim 10, wherein the clutching means is configured to hold the ring gear still when the clutch is operated to the engaged state.

12. The system in accordance with claim 1, wherein the torque coupling device comprises
   a first directional clutch configured to couple the engine to the dynamo such that during the first mode the engine is not motored by the dynamo,
   a clutching means operable to an engaged state whereby torque is transferred through the clutching means, and operable to a disengaged state whereby no torque is transferred through the clutching means, a second directional clutch coupling the engine to the clutching means such that when the dynamo is rotating and the engine is not operating and the clutching means is disengaged, the second mode of operation is initiated by engaging the clutching means so the engine is motored by the dynamo, a planetary gear set interposed between the dynamo and the engine, said planetary gear set comprising a sun gear, ring gear and a carrier of planetary gears, wherein the sun gear is coupled to the dynamo, the carrier is coupled to the second directional clutch, and the ring gear is coupled to the clutching means, wherein the clutching means is configured to hold the ring gear still when the clutching means is operated to the engaged state.

13. The system in accordance with claim 12, wherein the system further comprises a controller coupled to the energy storage device, the engine, the dynamo, and the clutching means.

14. A controller configured to be coupled to an engine configured to operate at an engine speed, coupled to a single dynamo configured to operate in a motor mode for generating mechanical energy and operate in a generator mode for generating electrical energy, coupled to a clutching means, and coupled to an energy storage device, said controller further configured to (a) operate in a first mode wherein the dynamo is coupled to the energy storage device by the controller to operate the dynamo in the motor mode for propelling the vehicle, the engine is not operated, and the engine is not coupled to the dynamo, (b) operate in a second mode wherein the dynamo is coupled to the energy storage device by the controller to operate the dynamo in the motor mode for propelling the vehicle, and the dynamo is coupled to the engine such that the engine is motored by the dynamo for starting the engine, (c) operate in a third mode wherein the dynamo is coupled to the energy storage device by the controller to operate the dynamo in the motor mode for propelling the vehicle, and the engine is operated by the controller at an engine speed less than a speed threshold whereby the engine does not propel the vehicle, and (d) operate in a fourth mode wherein the engine is operated by the controller at an engine speed equal to or greater than the speed threshold for propelling the vehicle.

15. A torque coupling device for a hybrid vehicle propulsion system configured to variably couple an engine to a single dynamo, said torque coupling device comprising:

a first directional clutch configured to couple the engine to the dynamo such that during a first mode the engine is not motored by the dynamo, a clutching means operable to an engaged state whereby torque is transferred through the clutching means, and operable to a disengaged state whereby no torque is transferred through the clutching means, a second directional clutch coupling the engine to the clutching means such that when the dynamo is rotating and the engine is not operating and the clutching means is disengaged, a second mode of operation is initiated by engaging the clutching means so the engine is motored by the dynamo for starting the engine.

16. The torque coupling device in accordance with claim 15, said torque coupling device further comprising a planetary gear set interposed between the dynamo and the engine, said planetary gear set comprising a sun gear, ring gear and a carrier of planetary gears, wherein the sun gear is coupled to the dynamo, the carrier is coupled to the second directional clutch, and the ring gear is coupled to the clutching means, wherein the clutching means is configured to hold the ring gear still when the clutch is operated to the engaged state.

17. The torque coupling device in accordance with claim 15, wherein said torque coupling device is configured to (a) operate in the first mode wherein the dynamo is coupled to an energy storage device to operate the dynamo in the motor mode for propelling the vehicle, the engine is not operated, and the engine is not coupled to the dynamo, (b) operate in the second mode wherein the dynamo is coupled to the energy storage device to operate the dynamo in the motor mode for propelling the vehicle, and the dynamo is coupled to the engine such that the engine is motored by the dynamo for starting the engine, (c) operate in a third mode wherein the dynamo is coupled to the energy storage device to operate the dynamo in the motor mode for propelling the vehicle, and the engine is operated at an engine speed less than a speed threshold whereby the engine does not propel the vehicle, and (d) operate in a fourth mode wherein the engine is operated at an engine speed equal to or greater than the speed threshold for propelling the vehicle.

* * * * *